(12) United States Patent
Hall et al.

(10) Patent No.: US 12,552,218 B1
(45) Date of Patent: Feb. 17, 2026

(54) AIR SPRING SUSPENSION SYSTEM WITH VARIABLE FLOW VALVES

(71) Applicant: GM GLOBAL TECHNOLOGY OPERATIONS LLC, Detroit, MI (US)

(72) Inventors: Devon Robert Hall, Ann Arbor, MI (US); Matthew Watts, South Lyon, MI (US); McGregor Coyne, Farmington Hills, MI (US); Brian K. Saylor, South Lyon, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/175,205

(22) Filed: Apr. 10, 2025

(51) Int. Cl.
*B60G 17/052* (2006.01)
*B60G 17/015* (2006.01)
*B60G 17/016* (2006.01)

(52) U.S. Cl.
CPC ..... *B60G 17/0528* (2013.01); *B60G 17/0155* (2013.01); *B60G 17/016* (2013.01); *B60G 2202/152* (2013.01); *B60G 2202/154* (2013.01); *B60G 2400/25* (2013.01); *B60G 2500/2042* (2013.01); *B60G 2500/326* (2013.01); *B60G 2600/08* (2013.01); *B60G 2600/11* (2013.01)

(58) Field of Classification Search
CPC ............ B60G 17/0528; B60G 17/0155; B60G 17/016; B60G 2202/152; B60G 2202/154; B60G 2400/25; B60G 2500/2042; B60G 2500/326; B60G 2600/08; B60G 2600/11
See application file for complete search history.

(56) References Cited

U.S. PATENT DOCUMENTS

| | | | | |
|---|---|---|---|---|
| 5,322,321 | A * | 6/1994 | Yopp | B60G 17/0157 280/5.514 |
| 6,276,710 | B1 * | 8/2001 | Sutton | B60G 5/04 280/124.16 |
| 2016/0272035 | A1 * | 9/2016 | Oishi | B60G 17/017 |
| 2016/0280034 | A1 * | 9/2016 | Ogino | B60G 17/052 |

(Continued)

FOREIGN PATENT DOCUMENTS

DE 10330432 A1 2/2005
DE 102019219880 A1 6/2021

OTHER PUBLICATIONS

German Office Action from counterpart DE1020251206937, dated Dec. 19, 2025.

*Primary Examiner* — Toan C To

(57) ABSTRACT

An air spring suspension system includes first, second, third, and fourth air spring assemblies configured to support a frame of the vehicle at front and rear suspension/wheel assemblies of the vehicle. A valve block includes a valve. A compressor supplies pressurized gas to the valve block. A reservoir is in fluid communication with the valve block. The air spring suspension system includes first, second, third, and fourth height sensors. First, second, third, and fourth variable flow valves are in fluid communication with the valve of the valve block and the first, second, third, and fourth air spring assemblies, respectively. A pressure sensor senses pressure in the valve block. A vehicle kinematic sensor senses a vehicle kinematic parameter. A controller is configured to control the first, second, third, and fourth variable flow valves in response to the pressure, the first, second, third, and fourth height sensors, and the vehicle kinematic parameter.

19 Claims, 5 Drawing Sheets

(56) References Cited

U.S. PATENT DOCUMENTS

| | | | | |
|---|---|---|---|---|
| 2017/0349023 | A1* | 12/2017 | Mori | B60G 17/0195 |
| 2017/0361672 | A1* | 12/2017 | Ahmadian | B60G 17/019 |
| 2018/0029432 | A1* | 2/2018 | Kondo | B60G 17/0162 |
| 2019/0084365 | A1* | 3/2019 | Oishi | B60G 17/0523 |
| 2019/0085841 | A1* | 3/2019 | Ito | B60G 17/0155 |
| 2020/0238782 | A1* | 7/2020 | Vaughan | F15B 1/08 |
| 2020/0247210 | A1* | 8/2020 | Sirke | B60G 17/0525 |
| 2020/0298645 | A1* | 9/2020 | Hirao | B60G 17/016 |
| 2021/0061040 | A1* | 3/2021 | Coombs | B60G 17/019 |
| 2022/0055436 | A1* | 2/2022 | Kizu | B60G 17/0523 |
| | | | | 280/124.157 |

\* cited by examiner

AIR SPRING SUSPENSION SYSTEM WITH VARIABLE FLOW VALVES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to suspension control systems, and more particularly to suspension control systems for air spring suspension systems.

Vehicles may include an air spring suspension system arranged between a frame of the vehicle and wheels of the vehicle. The air spring suspension system includes air spring assemblies. Typically, a solenoid valve block includes a single valve to control air pressure supplied to each air spring. The single solenoid valve block allows each of the air spring assemblies to be charged or discharged from a single air supply unit such as a compressor and/or a pressurized air tank.

SUMMARY

An air spring suspension system for a vehicle includes first and second air spring assemblies configured to support a frame of the vehicle at front suspension/wheel assemblies of the vehicle. Third, and fourth air spring assemblies are configured to support a frame of the vehicle at rear suspension/wheel assemblies of the vehicle. A valve block includes a valve. A compressor supplies pressurized gas to the valve block. A reservoir is in fluid communication with the valve block. The air spring suspension system includes first, second, third, and fourth height sensors. First, second, third, and fourth variable flow valves are in fluid communication with the valve of the valve block and the first, second, third, and fourth air spring assemblies, respectively. A pressure sensor is configured to sense a pressure in the valve block. A vehicle kinematic sensor is configured to sense a vehicle kinematic parameter. A controller is configured to control the first, second, third, and fourth variable flow valves in response to the pressure, the first, second, third, and fourth height sensors, and the vehicle kinematic parameter.

In other features, the controller is configured to calculate a valve actuation command for at least one of the first, second, third, and fourth variable flow valves based on an estimated air mass to provide a predetermined movement for at least one of the first, second, third, and fourth air spring assemblies.

In other features, the controller is configured to calculate the valve actuation command further based on a difference between the pressure in the valve block and a pressure of at least one of the first, second, third, and fourth air spring assemblies.

In other features, the valve actuation command is further based on a vehicle motion rate limit. The valve actuation command is further based on a vehicle load location estimate.

In other features, the controller is configured to output the valve actuation command when the vehicle is within a pre-determined range of a target trim. controller is configured to modify the valve actuation command using closed-loop control to control a vehicle motion rate below a predetermined motion rate limit. The controller is configured to modify the valve actuation command using feed forward control to control a vehicle motion rate below a predetermined rate limit. The controller is configured to modify the valve actuation command based on a front/rear offset from a trim difference, a motion volume ratio, and a spring volume ratio. The controller is configured to modify the valve actuation command based on a left/right offset from a trim difference.

In other features, a diagnostic module is configured to selectively identify a line leak and an air spring leak corresponding to at least one of the first, second, third, and fourth air spring assemblies in response to the pressure during air spring fill operations of the first, second, third, and fourth air spring assemblies, respectively. The diagnostic module is configured to set an air spring diagnostic flag in response to the first, second, third, and fourth height sensors when a difference between a measured vehicle motion and a predetermined vehicle motion is greater than a predetermined threshold during air suspension actuation. The diagnostic module is configured to open and close at least one of the first, second, third, and fourth variable flow valves a plurality of times within a predetermined period to unclog a corresponding flow path.

In other features, the diagnostic module is configured to selectively identify the line leak for the at least one of the first, second, third, and fourth variable flow valves when the pressure is less than a first predetermined pressure during the air spring fill operation and the pressure is less than a second predetermined pressure when the corresponding one of at least one of the first, second, third, and fourth variable flow valves is closed.

In other features, the diagnostic module is configured to selectively identify the air spring leak for the at least one of the first, second, third, and fourth air spring assemblies when the pressure is less than a first predetermined pressure during the air spring fill operation and the pressure is greater than a second predetermined pressure when the corresponding one of at least one of the first, second, third, and fourth variable flow valves is closed.

An air spring suspension system for a vehicle includes first and second air spring assemblies configured to support a frame of the vehicle at front suspension/wheel assemblies of the vehicle. Third, and fourth air spring assemblies configured to support a frame of the vehicle at rear suspension/wheel assemblies of the vehicle. A valve block includes a valve. A compressor supplies pressurized air to the valve block. A reservoir is in fluid communication with the valve block. First, second, third, and fourth variable flow valves are in fluid communication with the valve of the valve block and the first, second, third, and fourth air spring assemblies, respectively. The air spring suspension system includes first, second, third, and fourth height sensors. A pressure sensor is configured to sense a pressure in the valve block. A controller includes a suspension control module configured to control the first, second, third, and fourth variable flow valves in response to the pressure. A diagnostic module is configured to selectively identify a line leak and an air spring leak corresponding to the first, second, third, and fourth air spring assemblies in response to the pressure during air spring fill operations of the first, second, third, and fourth air spring assemblies, respectively, and the first, second, third, and fourth height sensors.

In other features, the diagnostic module is configured to set an air spring diagnostic flag in response to the first, second, third, and fourth height sensors when a difference between a measured vehicle motion and a predetermined vehicle motion is greater than a predetermined threshold during air suspension actuation. The diagnostic module is configured to open and close at least one of the first, second, third, and fourth variable flow valves a plurality of times within a predetermined period to unclog a corresponding flow path.

In other features, the diagnostic module is configured to selectively identify the line leak for the at least one of the first, second, third, and fourth variable flow valves when the pressure is less than a first predetermined pressure during the air spring fill operation and the pressure is less than a second predetermined pressure when the corresponding one of at least one of the first, second, third, and fourth variable flow valves is closed.

In other features, the diagnostic module is configured to selectively identify the air spring leak for the at least one of the first, second, third, and fourth air spring assemblies when the pressure is less than a first predetermined pressure during the air spring fill operation and the pressure is greater than a second predetermined pressure when the corresponding one of at least one of the first, second, third, and fourth variable flow valves is closed.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A suspension control system for air spring suspension systems according to the present disclosure includes electronically-controlled variable flow valves that control pressurized air supplied to front and rear sets of air spring assemblies. The variable flow valves allow for higher fidelity motion control of each of the air spring assemblies and enable enhanced diagnostics for the suspension control system.

Figure 1A:
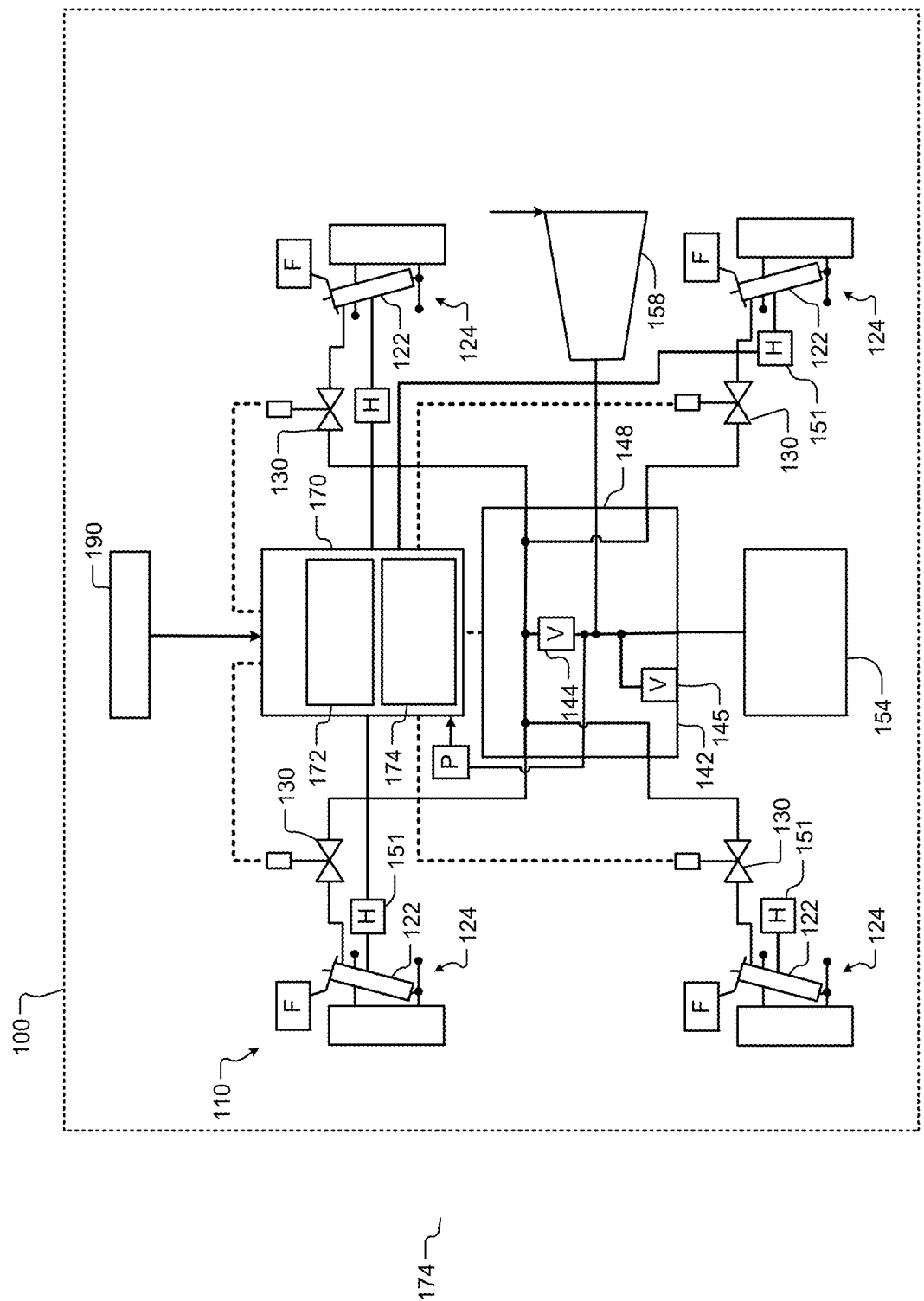
FIG. 1A is a functional block diagram of an example of an air spring suspension system according to the present disclosure.
Figure 1B:
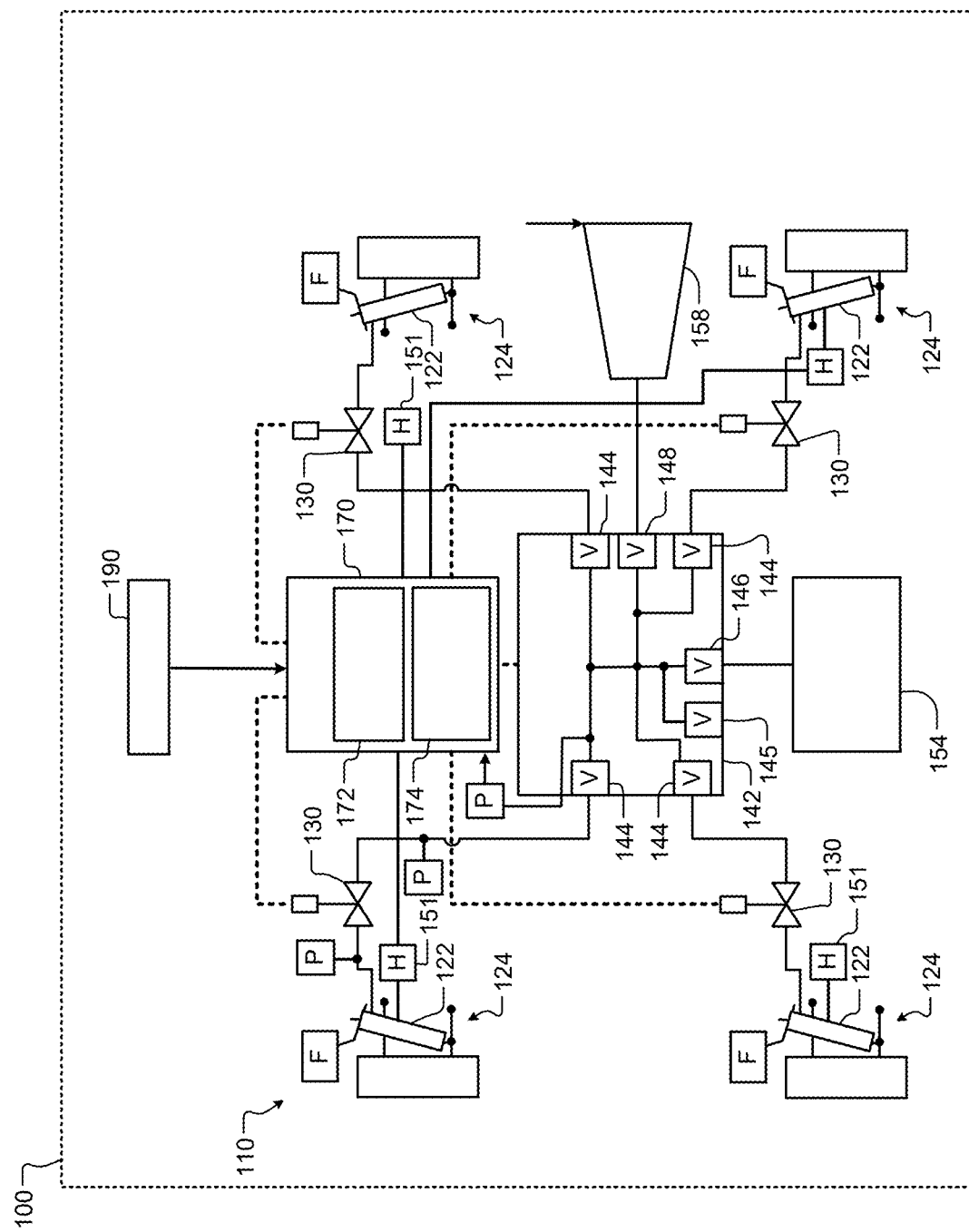
FIG. 1B is a functional block diagram of another example of an air spring suspension system according to the present disclosure.

Referring now to FIGS. 1A and 1B, examples of air spring suspension systems are shown. In FIG. 1A, a vehicle 100 includes an air spring suspension system 110 including air spring assemblies 122 connecting a frame F of the vehicle 100 to front and rear suspensions/wheel assemblies 124 of the vehicle 100. In some examples, the air spring assemblies 122 include an air spring, an air spring surrounding a damper, a separate air spring and a damper, and/or other configurations. A solenoid valve block 142 is fluidly connected by variable flow valves 130 to the air spring assemblies 122 to allow more precise control thereof.

The solenoid valve block 142 includes one or more solenoid valves 144 that selectively supply pressurized air from a reservoir 154 and/or a compressor 158 to the variable flow valves 130. Various configurations of the solenoid valve block 142 can be used depending upon a desired level of control. For example in FIG. 1A, a single one of the solenoid valves 144 supplies pressurized air to all of the variable flow valves 130. However, other variations of solenoid valves can be used. In FIG. 1B, four of the solenoid valves 144 individually supply the variable flow valves 130, respectively. In still other examples, two of the solenoid valves 144 supply two of the variable flow valves 130 (e.g., supplying front sets and rear sets of air spring assemblies, respectively).

In some examples, the variable flow valves 130 comprise a valve with a variable orifice and/or valves that are pulse width modulated (PWM) open and closed to vary air pressure supplied to the air spring assemblies 122. In some examples, a valve 145 may be used to release pressure in the solenoid valve block 142 when a pressure sensed by a pressure sensor P is greater than a predetermined pressure. In some examples, a valve 146 and/or a valve 148 (FIG. 1B) may be provided to selectively connect or disconnect the reservoir 154 and/or the compressor 158, respectively, from the solenoid valve block 142.

Height sensors 151 generate position signals representing a position of the air spring assemblies 122 which typically corresponds to the suspension height of the vehicle at the respective corners of the vehicle.

A controller 170 includes a suspension control module 172 configured to control the valves 144, 145, 146, and/or 148 in the solenoid valve block 142 and the variable flow valves 130 as will be described further below. The pressure sensor P senses pressure in the solenoid valve block 142. As can be seen in FIG. 1B, additional pressure sensors can sense pressure at other locations corresponding to each of the front and/or rear wheels. The controller 170 also includes a diagnostic module 174 described further below.

The controller 170 receives data from a vehicle kinematic sensor 190 configured to sense one or more vehicle kinematic parameters. In some examples, the vehicle kinematic sensor 190 includes an inertia measurement unit (IMU) configured to sense vehicle inertia. The vehicle inertia, vehicle weight, vehicle kinematic parameters (such as inertia, acceleration, braking, and other parameters) can be used to estimate pressure within the air spring assemblies. In other examples, the pressure sensor at the solenoid valve block can be used to measure pressure in the air spring by opening the corresponding variable air valve at each location sequentially while the others are closed and measuring pressure using the pressure sensor P.

Figure 2:
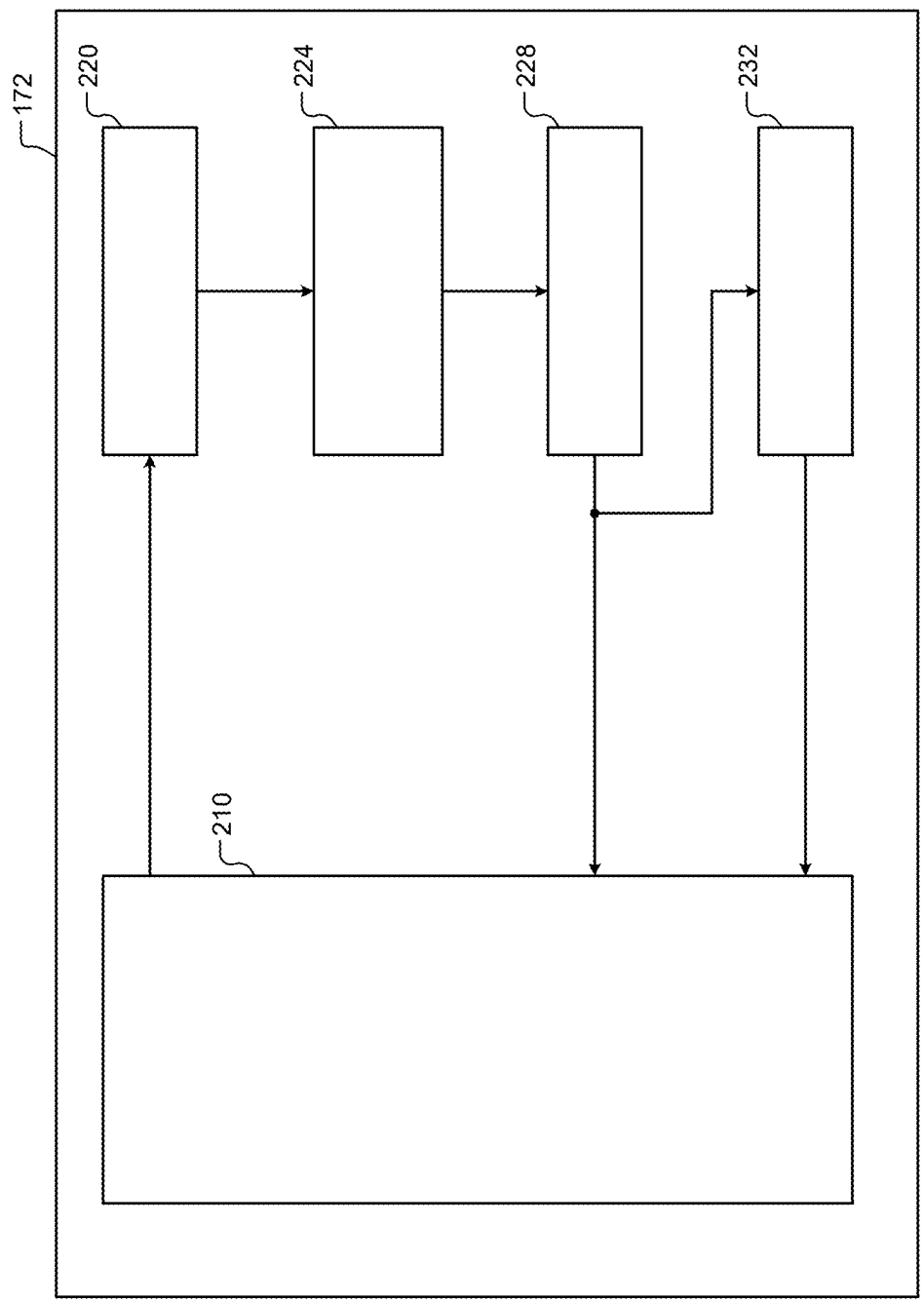
FIG. 2 is a functional block diagram of a suspension control module operating in feed forward mode for controlling the air spring suspension system according to the present disclosure.

Referring now to FIG. 2, the suspension control module 172 may use feed forward control for controlling the variable flow valves 130 controlling the air spring assemblies 122. The suspension control module 172 includes an air suspension monitoring module 210, a valve actuation command calculating module 220, a first scaling module 224, a second scaling module 228, and a valve actuation command calculating module 232.

The air suspension monitoring module 210 outputs the measured pressure P corresponding to the pressure in the reservoir 154, a target air mass change calculated for each of the air spring assemblies 122, a current pressure calculated for each spring, and a motion rate limit to the valve actuation command calculating module 220. The valve actuation command calculating module 220 calculates a valve actuation command for each of the spring assemblies 122 based on the measured pressure P, the target air mass change for each of the air spring assemblies 122, the current pressure for each of the air spring assemblies 122, and the motion rate limit.

The first scaling module 224 scales the valve actuation commands for each of the air spring assemblies 122 based on vehicle kinematics (e.g., suspension motion ratios and spring volumes) to generate first scaled valve actuation commands. The second scaling module 228 receives the scaled valve actuation commands and scales the first scaled valve actuation commands based on a detected load location and outputs second scaled valve actuation commands for each of the air spring assemblies 122 to the air suspension monitoring module 210. The valve actuation command calculating module 232 calculates and outputs a valve actuation start ramp and end ramp for each of the air spring assemblies 122 based on the second scaled valve actuation commands to the air suspension monitoring module 210. The air suspension monitoring module 210 use the start and end ramps as well as the valve actuation command.

Figure 3:
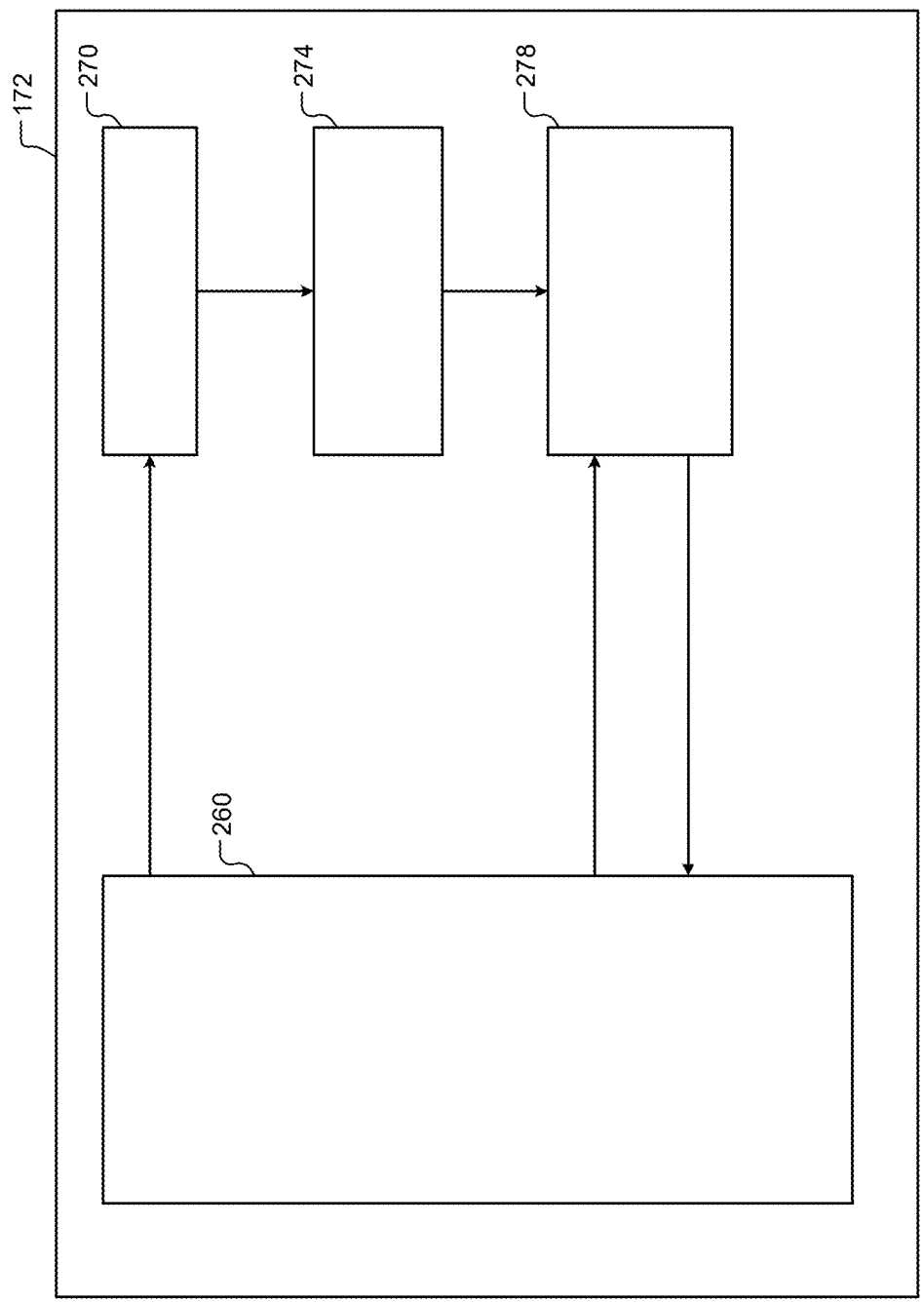
FIG. 3 is a functional block diagram of a suspension control module operating in closed-loop mode for controlling the air spring suspension system according to the present disclosure.

Referring now to FIG. 3, the suspension control module 172 may use closed loop feedback for controlling the variable flow valves 130 controlling the air spring assemblies 122. Closed-loop feedback modifies the valve actuation command during air suspension actuation to control a vehicle motion rate below a rate limit. The system can further modify valve actuation during air suspension actuation based on front/rear offset from trim difference, left/right offset from trim difference, as well as motion and spring volume ratios.

As used herein, offset from trim difference refers to measured concurrency of movement in front/rear and/or left/right directions. In other words, the height sensors measure trim differences front/rear or left/right to detect raising or lowering at different speeds. For example, a sample suspension movement requires the front and rear heights to be 10 mm above a normal ride height (e.g., 0 mm offset from trim). After 0.5 seconds of suspension movement, the front has raised 7 mm and the rear has raised 5 mm. At that point, the front/rear offset from trim difference is 2 mm. The air spring suspension systems uses the difference to enable improved speed control of the front/rear (and left/right) movement. In other words, the front/rear offset from trim difference should be closer to 0 mm instead 2 mm and control of the variable flow valves is adjusted accordingly.

The suspension control module 172 includes an air suspension monitoring module 260, a valve actuation command calculating module 270, a first scaling module 274, and a second scaling module 278. The air suspension monitoring module 260 outputs a measured motion rate for each of the air spring assemblies 122, prior valve actuation commands, a motion rate target, and a motion rate limit to the valve actuation command calculating module 270. The valve actuation command calculating module 270 calculates a valve actuation command for each spring based on the measured motion rate for each of the air spring assemblies 122, the prior valve actuation commands, the motion rate target, and the motion rate limit.

The first scaling module 274 scales the valve actuation commands for each of the air spring assemblies based on vehicle kinematics (e.g., suspension motion ratios and spring volumes) to generate first scaled valve actuation commands. The second scaling module 278 receives the first scaled valve actuation commands from the first scaling module 274 and front/rear and left/right offsets from trim differences from the air suspension monitoring module 260. The second scaling module 278 scales the first scaled valve actuation commands based on the front/rear and left/right offsets and outputs second scaled valve actuation commands for each of the air spring assemblies 122 to the air suspension monitoring module 260. The air suspension monitoring module 260 use the start and end ramps as well as the valve actuation command.

The control systems described in FIGS. 2 and 3 include the variable flow valves 130 connected each of the air spring assemblies 122. The air suspension monitoring modules 210 and/or 260 use the start and end ramps as well as the valve actuation command to allow for improved pneumatic diagnostics and remedial actions.

In some examples, valve performance diagnostics are run when measured vehicle motion is greater than a predetermined threshold from an expected vehicle motion during air suspension actuation. In some examples, if the vehicle motion is less than expected, the system takes remedial action such as commanding the variable flow valves to open and close a predetermined number of times within a predetermined period (e.g., rapidly) to unclog a flow path.

In some examples, the diagnostic module detects a line leak fault when the measured pressure of the solenoid valve block is below a first predetermined pressure threshold during an air suspension actuation and the measured pressure of the solenoid valve block is below a second predetermined threshold when the variable flow valve is in the fully closed position.

In some examples, the diagnostic module detects an air spring leak when the measured pressure of the solenoid valve block is below a first predetermined pressure threshold and the measured pressure of the solenoid valve block is above a third predetermined threshold when the variable flow valve is in the fully closed position.

Figure 4:
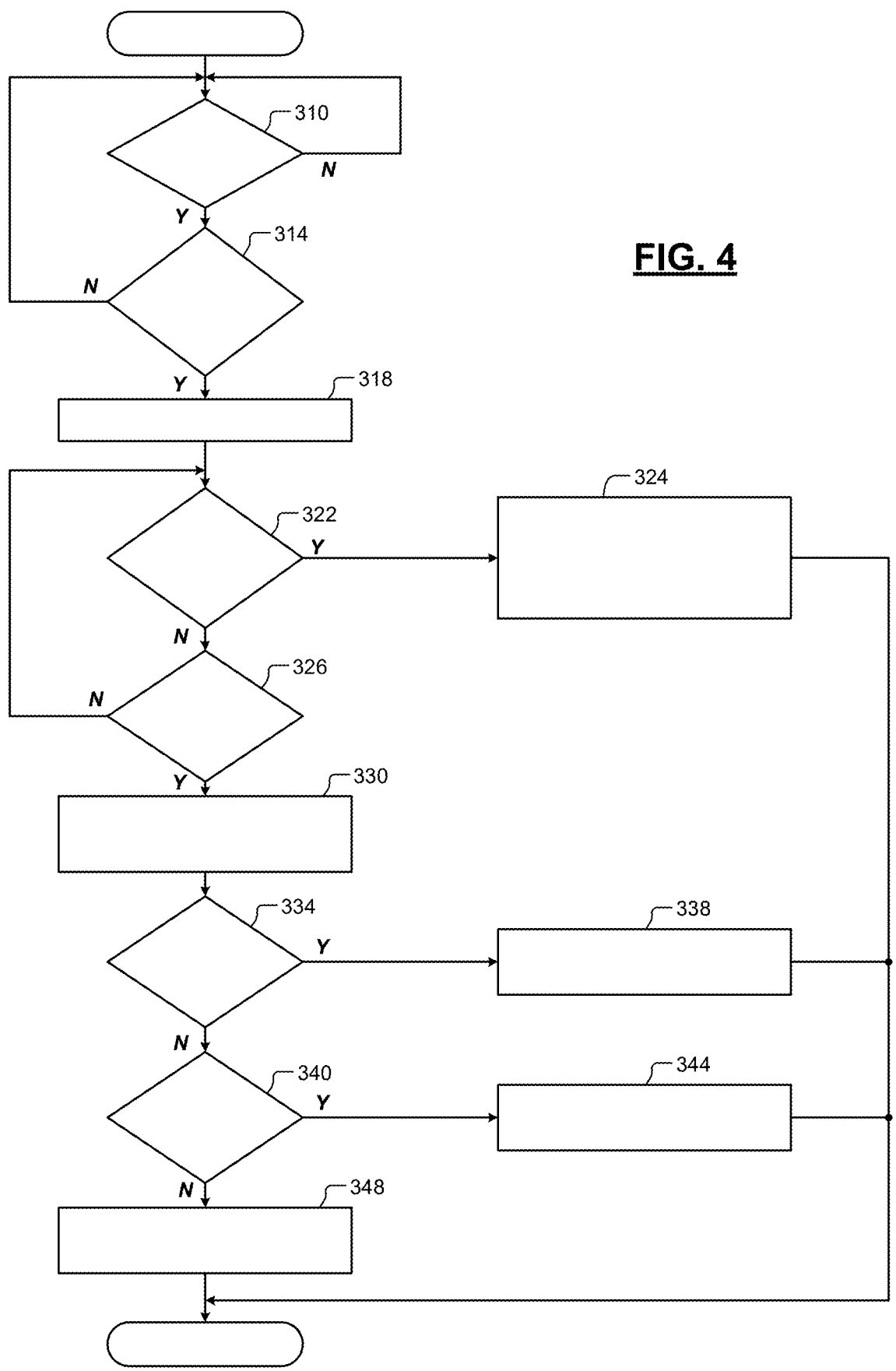
FIG. 4 is a flowchart of a method for diagnosing faults in the air spring suspension system according to the present disclosure.

Referring now to FIG. 4, a method for diagnosing leaks is shown. At 310, the method determines whether there is an air spring fill operation. If true, the method continues at 314 and determines whether the measured pressure in the solenoid valve block is less than a first predetermined threshold (e.g., a small leak pressure threshold $P_{sm\_leak}$). If 314 is true, the method sets a Leak_Flag equal to true at 318. At 322, the method determines whether the measured pressure of the solenoid valve block is less than a second predetermined pressure threshold (e.g., a large leak pressure threshold $P_{lg\_leak}$). If 322 is true and a large leak occurred, the method aborts air spring fill, closes the valve of the solenoid valve block, closes the variable flow valves, sets a large leak diagnostic flag, and control ends.

If 322 is false, the method continues at 326 and determines whether an air spring fill operation is complete. If 326 is true, the method continues at 330 and closes the variable flow valves and measures the pressure of the solenoid valve block. At 334, the method determines whether the pressure of the solenoid valve block is less than a line leak pressure threshold $P_{linleak}$. If 334 is true, the line leak diagnostic flag is set at 338, and control ends.

If 334 is false, the method continues at 340 and determines whether the solenoid valve block pressure is greater than a third predetermined pressure (e.g., an air spring leak pressure threshold $P_{airspringleak}$). If 340 is true, the method sets an air spring diagnostic flag at 344. If 340 is false, the method sets the Leak_Flag to false at 348 and control ends.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An air spring suspension system for a vehicle, comprising:
   first and second air spring assemblies configured to support a frame of the vehicle at front suspension/wheel assemblies of the vehicle;
   third, and fourth air spring assemblies configured to support a frame of the vehicle at rear suspension/wheel assemblies of the vehicle;
   a valve block including a valve;
   a compressor supplying pressurized gas to the valve block;
   a reservoir in fluid communication with the valve block;
   first, second, third, and fourth height sensors configured to sense heights corresponding to the first, second, third, and fourth air spring assemblies, respectively;
   first, second, third, and fourth variable flow valves in fluid communication with the valve of the valve block and the first, second, third, and fourth air spring assemblies, respectively;
   a pressure sensor configured to sense a pressure in the valve block;
   a vehicle kinematic sensor configured to sense a vehicle kinematic parameter; and
   a controller configured to control the first, second, third, and fourth variable flow valves in response to the pressure, the first, second, third, and fourth height sensors, and the vehicle kinematic parameter,
   wherein the controller is configured to calculate a valve actuation command for at least one of the first, second, third, and fourth variable flow valves based on an estimated air mass to provide a predetermined movement for at least one of the first, second, third, and fourth air spring assemblies.

2. The air spring suspension system of claim 1, wherein the controller is configured to calculate the valve actuation command further based on a difference between the pressure in the valve block and a pressure of at least one of the first, second, third, and fourth air spring assemblies.

3. The air spring suspension system of claim 1, wherein the valve actuation command is further based on a vehicle motion rate limit.

4. The air spring suspension system of claim 1, wherein the valve actuation command is further based on a vehicle load location estimate.

5. The air spring suspension system of claim 1, wherein the controller is configured to output the valve actuation command when the vehicle is within a pre-determined range of a target trim.

6. The air spring suspension system of claim 1, wherein the controller is configured to modify the valve actuation command using closed-loop control to control a vehicle motion rate below a predetermined motion rate limit.

7. The air spring suspension system of claim 1, wherein the controller is configured to modify the valve actuation command using feed forward control to control a vehicle motion rate below a predetermined rate limit.

8. The air spring suspension system of claim 1, wherein the controller is configured to modify the valve actuation command based on a front/rear offset from a trim difference, a motion volume ratio, and a spring volume ratio.

9. The air spring suspension system of claim 1, wherein the controller is configured to modify the valve actuation command based on a left/right offset from a trim difference.

10. The air spring suspension system of claim 1, further comprising a diagnostic module configured to selectively identify a line leak and an air spring leak corresponding to at least one of the first, second, third, and fourth air spring assemblies in response to the pressure during air spring fill operations of the first, second, third, and fourth air spring assemblies, respectively.

11. The air spring suspension system of claim 10, wherein the diagnostic module is configured to set an air spring diagnostic flag in response to the first, second, third, and fourth height sensors when a difference between a measured vehicle motion and a predetermined vehicle motion is greater than a predetermined threshold during air suspension actuation.

12. The air spring suspension system of claim 10, wherein the diagnostic module is configured to open and close at least one of the first, second, third, and fourth variable flow valves a plurality of times within a predetermined period to unclog a corresponding flow path.

13. The air spring suspension system of claim 10, wherein the diagnostic module is configured to selectively identify the line leak for the at least one of the first, second, third, and fourth variable flow valves when:
   the pressure is less than a first predetermined pressure during the air spring fill operation; and
   the pressure is less than a second predetermined pressure when the corresponding one of at least one of the first, second, third, and fourth variable flow valves is closed.

14. The air spring suspension system of claim 10, wherein the diagnostic module is configured to selectively identify the air spring leak for the at least one of the first, second, third, and fourth air spring assemblies when:
   the pressure is less than a first predetermined pressure during the air spring fill operation; and
   the pressure is greater than a second predetermined pressure when the corresponding one of at least one of the first, second, third, and fourth variable flow valves is closed.

15. An air spring suspension system for a vehicle, comprising:
   first and second air spring assemblies configured to support a frame of the vehicle at front suspension/wheel assemblies of the vehicle;
   third, and fourth air spring assemblies configured to support a frame of the vehicle at rear suspension/wheel assemblies of the vehicle;
   a valve block including a valve;
   a compressor supplying pressurized air to the valve block;
   a reservoir in fluid communication with the valve block;
   first, second, third, and fourth variable flow valves in fluid communication with the valve of the valve block and the first, second, third, and fourth air spring assemblies, respectively;
   first, second, third, and fourth height sensors corresponding to the first, second, third, and fourth air spring assemblies, respectively;
   a pressure sensor configured to sense a pressure in the valve block; and
   a controller including:
      a suspension control module configured to control the first, second, third, and fourth variable flow valves in response to the pressure; and a diagnostic module configured to selectively identify a line leak and an air spring leak corresponding to the first, second, third, and fourth air spring assemblies in response to the pressure during air spring fill operations of the first, second, third, and fourth air spring assemblies, respectively, and the first, second, third, and fourth height sensors.

16. The air spring suspension system of claim 15, wherein the diagnostic module is configured to set an air spring diagnostic flag in response to the first, second, third, and fourth height sensors when a difference between a measured vehicle motion and a predetermined vehicle motion is greater than a predetermined threshold during air suspension actuation.

17. The air spring suspension system of claim 15, wherein the diagnostic module is configured to open and close at least one of the first, second, third, and fourth variable flow valves a plurality of times within a predetermined period to unclog a corresponding flow path.

18. The air spring suspension system of claim 15, wherein the diagnostic module is configured to selectively identify the line leak for the at least one of the first, second, third, and fourth variable flow valves when:
   the pressure is less than a first predetermined pressure during the air spring fill operation; and
   the pressure is less than a second predetermined pressure when the corresponding one of at least one of the first, second, third, and fourth variable flow valves is closed.

19. The air spring suspension system of claim 15, wherein the diagnostic module is configured to selectively identify the air spring leak for the at least one of the first, second, third, and fourth air spring assemblies when:
   the pressure is less than a first predetermined pressure during the air spring fill operation; and
   the pressure is greater than a second predetermined pressure when the corresponding one of at least one of the first, second, third, and fourth variable flow valves is closed.

\* \* \* \* \*